C. J. PORTER, Sr.
CASTER.
APPLICATION FILED FEB. 18, 1915.
1,150,883.
Patented Aug. 24, 1915.
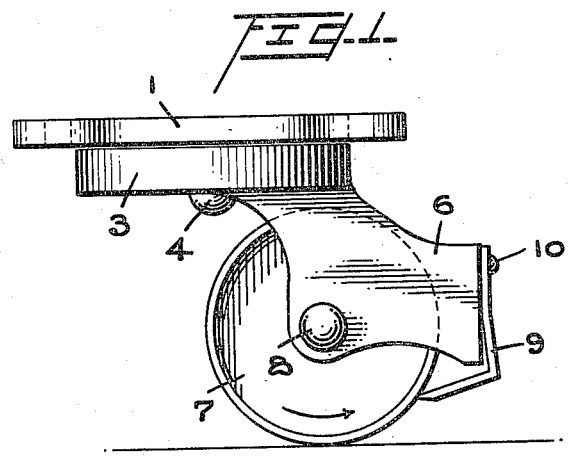
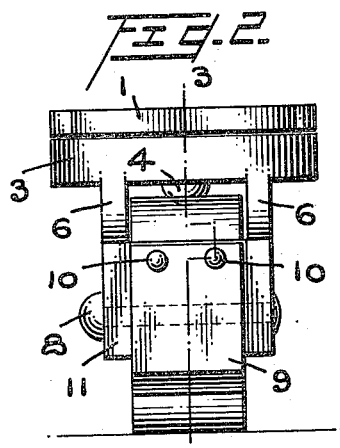
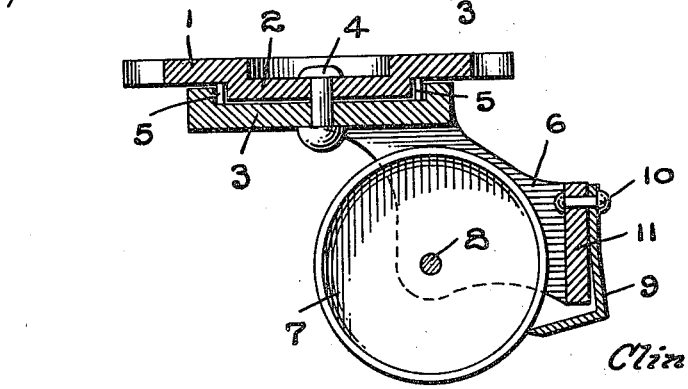
Witnesses
Inventor
Clinton J. Porter Sr.
By Joshua R. H. Potts.
His Attorney

UNITED STATES PATENT OFFICE.

CLINTON JACKSON PORTER, SR., OF CAMPELLO, MASSACHUSETTS.

CASTER.

1,150,883.  Specification of Letters Patent.  Patented Aug. 24, 1915.

Application filed February 18, 1915. Serial No. 9,094.

*To all whom it may concern:*

Be it known that I, CLINTON J. PORTER, Sr., a citizen of the United States, residing at Campello, in the county of Plymouth and State of Massachusetts, have invented certain new and useful Improvements in Casters, of which the following is a specification.

My invention relates to improvements in casters, the object of the invention being to provide a caster which is designed for use as a support for shoe racks and other devices adapted to be rolled over the floor, and is particularly designed for use on floors where sticky wax and thread accumulate, as the caster is provided with an improved construction of scraper to cut the wax and thread from the caster wheel, and keep the latter clean when in operation.

A further object is to provide an improved construction of caster in which the bracket carrying the wheel extends rearwardly from the pivotal connection, and is formed with a rearward extension supporting a scraper, so that the scraper is always located at the rear of the wheel and serves to keep the wheel free from substances that would adhere thereto, and also said extension operates to protect the scraper and the wheel as it serves as a buffer in the event the wheel should be violently moved against some object or obstruction.

With these and other objects in view, the invention consists in certain novel features of construction and combinations and arrangements of parts as will be more fully hereinafter described and pointed out in the claim.

In the accompanying drawings: Figure 1 is a view in side elevation illustrating my improved caster. Fig. 2 is a view in staggered end elevation at right angles to Fig. 1. Fig. 3 is a view in longitudinal section on the staggered line 3—3 of Fig. 2.

1 represents a plate adapted to be secured to the rack or other device to which it is desired to apply the caster. This plate 1 is formed with a central circular depression 2 constituting a journal mounted to turn in a bearing cup 3, and provided with a central pivot 4, coupling the parts together, but allowing them free rotary movement. Between the journal 2 and the cup 3, I provide a circular series of roller bearings 5, which, together with the pivot 4, allow the bracket a free rotary movement relative to the plate to insure a proper operation of the caster. An integral bifurcated bracket 6 is made integral with the cup 3, and extends rearwardly from the cup, so that the wheel 7, which has rotary mounting on a transverse journal 8 in the bracket is located in rear of the pivot 4 and in normal operation will always be so positioned, as the movement of the rack or other device over the floor will compel the wheel to assume its position in rear of the pivot. This is important, because it compels the caster wheel to turn always in the direction of the arrow, so that it can be effectually cleaned by my improved scraper 9.

The scraper 9 is angular in form as shown clearly in Figs. 1 and 3, and is secured by rivets 10 or other securing devices to the transverse member 11 of the bracket 6. This transverse member 11 is relatively heavy and strong so as to sustain any blows or shocks which might come upon it, and thereby prevents any possibility of injuring the scraper by blows of any sort. Furthermore, the transverse bar 11 holds the scraper in such a position that it bears firmly against the periphery of the wheel 7, and as the wheel 7 must always turn in the direction of the arrow, a thorough scraping or cleaning of the surface of the roller is insured. As these casters are especially designed for use in shoe factories where the floors contain sticky wax and threads, it is necessary for the scraper to bear against the surface with considerably pressure to cut the wax and the thread from the surface of the wheel, and by reason of the construction above described, this improved result is had.

Various slight changes might be made in the general form and arrangement of parts described without departing from my invention, and hence I do not limit myself to the precise details set forth, but consider myself at liberty to make such changes and alterations as fairly fall within the spirit and scope of the appended claim.

Having thus described my invention, what I claim as new and desire to secure by Letters Patent is:

A caster, comprising a plate, and a bifurcated bracket, said bifurcated bracket pivotally connected to the plate, and extending laterally therefrom, and having a cross bar at its extreme end connecting the two side members of the bracket, a caster wheel having rotary mounting in the bracket, said caster wheel located between the side members of the bracket and in advance of the cross bar, and a scraper secured to the cross bar and bearing against the periphery of the wheel, substantially as described.

In testimony whereof I have signed my name to this specification in the presence of two subscribing witnesses.

CLINTON JACKSON PORTER, Sr.

Witnesses:
 GEO. H. LEACH,
 LILLIAN D. LEACH.

Copies of this patent may be obtained for five cents each, by addressing the "Commissioner of Patents, Washington, D. C."